United States Patent
Bosenko

(10) Patent No.: US 9,130,606 B2
(45) Date of Patent: Sep. 8, 2015

(54) WIRELESS TRANSMISSION SYSTEM, METHOD FOR WIRELESSLY TRANSMITTING A DATA STREAM BETWEEN A TRANSMITTING APPARATUS AND A RECEIVING APPARATUS, METHOD FOR WIRELESSLY RECEIVING A SIGNAL, TRANSMITTING APPARATUS FOR WIRELESSLY TRANSMITTING A DATA STREAM AND RECEIVING APPARATUS FOR WIRELESSLY RECEIVING TWO ELECTRIC SIGNALS TO PRODUCE A RECEIVED DATA STREAM

(76) Inventor: Rostyslav Volodymyrovych Bosenko, Kiev (UA)

( * ) Notice: Subject to any disclaimer, the term of this patent is extended or adjusted under 35 U.S.C. 154(b) by 0 days.

(21) Appl. No.: 14/347,301

(22) PCT Filed: Oct. 10, 2011

(86) PCT No.: PCT/UA2011/000094
§ 371 (c)(1),
(2), (4) Date: Mar. 26, 2014

(87) PCT Pub. No.: WO2013/055303
PCT Pub. Date: Apr. 18, 2013

(65) Prior Publication Data
US 2014/0226700 A1    Aug. 14, 2014

(30) Foreign Application Priority Data
Oct. 10, 2011    (UA) .................................. 201111915

(51) Int. Cl.
*H04B 1/38*    (2015.01)
*H04L 5/16*    (2006.01)
(Continued)

(52) U.S. Cl.
CPC ................ *H04B 7/02* (2013.01); *H04B 5/0012* (2013.01); *H04B 5/0031* (2013.01); *H04L 25/20* (2013.01)

(58) Field of Classification Search
CPC ...... H04B 7/02; H04B 5/0031; H04B 5/0012; H04B 5/00; H04B 5/0025; H04B 5/005; H04L 25/20
USPC ......... 375/219, 222, 220, 229, 295, 316, 318, 375/340, 257; 714/704; 455/41.1, 41.2
See application file for complete search history.

(56) References Cited

U.S. PATENT DOCUMENTS

| 4,763,340 A | 8/1988 | Yoneda et al. |
| 6,389,063 B1 * | 5/2002 | Kanekawa et al. ........... 375/222 |

(Continued)

FOREIGN PATENT DOCUMENTS

| EP | 1043850 A2 | 10/2000 |
| EP | 0810599 B1 | 11/2003 |
| RU | 2414054 | 3/2011 |

*Primary Examiner* — Phuong Phu

(57) ABSTRACT

The present disclosure describes apparatuses, methods and systems for high-speed, capacitive wireless data transmission between electronic devices. A transmitting apparatus is coupled to a data stream and comprises a signal preparer and two transmitting terminals. The signal preparer provides a copy of the data stream to a first transmitting terminal and an inverted version to a second transmitting terminal. Each transmitting terminal emanates an electric field representative of the signal it has received from the signal preparer. A receiving apparatus, separated in space from the transmitting apparatus by nonconductive material, comprises two receiving terminals separated in space from each other and a data stream restorer. Each receiving terminal detects the electric field emanated by the corresponding transmitting terminal, such that a received repeated signal is induced on the first receiving terminal and a received inverted signal is induced on the second receiving terminal. These received signals are combined to produce a received data stream.

30 Claims, 6 Drawing Sheets

(51) Int. Cl.
*H04B 7/02* (2006.01)
*H04B 5/00* (2006.01)
*H04L 25/20* (2006.01)

(56) References Cited

U.S. PATENT DOCUMENTS

| | | | |
|---|---|---|---|
| 7,907,902 B2 * | 3/2011 | Kato et al. | 455/41.2 |
| 7,979,754 B2 * | 7/2011 | Drost et al. | 714/704 |
| 8,391,783 B2 * | 3/2013 | Washiro | 455/41.1 |
| 8,798,531 B2 * | 8/2014 | Stucki et al. | 455/41.1 |
| 2003/0227983 A1 * | 12/2003 | Milne et al. | 375/302 |
| 2004/0258166 A1 * | 12/2004 | Camara et al. | 375/257 |
| 2005/0195027 A1 | 9/2005 | Regier | |
| 2009/0085696 A1 | 4/2009 | Abdul-Gafoor et al. | |
| 2010/0080270 A1 * | 4/2010 | Chen et al. | 375/219 |

* cited by examiner

WIRELESS TRANSMISSION SYSTEM, METHOD FOR WIRELESSLY TRANSMITTING A DATA STREAM BETWEEN A TRANSMITTING APPARATUS AND A RECENING APPARATUS, METHOD FOR WIRELESSLY RECENING A SIGNAL, TRANSMITTING APPARATUS FOR WIRELESSLY TRANSMITTING A DATA STREAM AND RECENING APPARATUS FOR WIRELESSLY RECENING TWO ELECTRIC SIGNALS TO PRODUCE A RECENED DATA STREAM

The present invention relates to the field of electronic communication systems. More specifically, the invention relates to high-speed, short-range, capacitive wireless systems, methods and apparatuses.

Wireless transmission of analog and digital signals has previously been accomplished using:

Radio (including LF, HF, VHF, SHF and microwave links);
Optical (such as laser or IR—used in most television remotes and IRDA);
Acoustics (usually ultrasound);
Inductive (also referred to as "magnetic") coupling; and
Capacitive coupling.

Radio transmissions diminish relatively slowly with distance. They are also subject to fades and wave interference. Radio transmissions are highly regulated as to their frequencies and radiated energy. Furthermore, as radio transmissions radiate energy, they require significant power.

Optical coupling type systems comprise a light emitting diode in a transmitting unit and a photo transistor in a receiving unit for receiving light from the diode. Optical transmissions are typically highly directional in nature. They are also stopped by objects in the transmission path. This directional aspect is often double edged; the directional aspect is often desirable to avoid interference, but this makes orientation and line of sight considerations important, and is often cumbersome. Also, these systems require significant power.

Ultrasound transmission systems are expensive and also use significant power. Inductive, or magnetic, coupling systems are known in which a transmitter generates a varying magnetic field which can be detected by a receiver in order to transmit data. For example, both near field communications and RFID transmit information by induction. In both cases, both the transmitting device and the receiving device possess coils which are highly resonant at the same frequency. The coil of the transmitting device generates a magnetic field, and the coil of the receiving device subtends as much as possible of that field. Using resonance helps the efficiency of energy transfer, but, at the same time, implies that the frequency, which allows such a system to work, is, or is very close to, the optimal (resonant) one. In the case of data transmission, such a narrow spectrum of working frequency further implies the necessity of modulation and relatively low bit rate (i.e., less than 1 megabit per second). For example, per ISO/IEC 14443, RFID receivers are powered at 13.56 MHz, data communications are modulated by a 847.5 kHz subcarrier, and data rates are typically between 106 to 848 kilobits per second.

Capacitive coupling systems are also known in which data is transferred from one conductive element to another conductive element, where the two conductors are separated by a nonconductor. An electric field is created between the two conductors and, as a result, a potential on the first conductor can, through the electric field, induce a potential on the second conductor. In some capacitive coupling systems, data is transmitted using the human body as the transmission medium, i.e., the dielectric. For example, U.S. Pat. No. 5,796,827 discloses apparatuses and methods for electronic communication "tak[ing] advantage of the fact that the human body is made up largely of electrolytic fluids, and is therefore capable of carrying electrical signals itself."

In other capacitive coupling systems, data is transmitted between integrated circuits. For example, U.S. Pat. No. 6,916,719 to Knight et al. discloses apparatuses and methods in which "pairs of half-capacitor plates, one half located on each chip, module or substrate are used to capacitively couple signals from one chip, module or substrate to another." These systems generally require the presence of a common power source and ground.

Other capacitive coupling systems generally exist. U.S. Pat. No. 6,336,031 to Schyndel discloses (i) a transmitter having a pair of electrodes separated in space, and transmit circuitry for varying the voltage difference applied across the electrodes in order to vary the spatial gradient of the electric potential field generated by the transmitter in accordance with the data to be transmitted, and (ii) a having a pair of electrodes separated in space and receive circuitry which detects these variations in the quasi-electrostatic potential field in order to receive the transmitted data.

U.S. Pat. No. 6,615,023 to Ehrensvard discloses a system for wireless, bi-directional transformation of electric signals over a capacitive interface between a host unit and a guest unit. The capacitive interface comprises three conductive areas on each of the host unit and the guest unit. The first conductive area of the host unit is connected to a self-tuning frequency generating resonant circuit in the host unit for obtaining high gain of signals transmitted to the guest unit. The second and third conductive areas of the host unit are connected to an impedance circuit in the host unit for receiving signals from the guest unit. The first and second conductive areas of the guest unit are further connected to an impedance circuit in the guest unit for receiving signals from the host unit. In a preferred embodiment, the first and third conductive areas of the guest unit are also galvanically interconnected.

U.S. Pat. No. 4,763,340 to Shigeo et al. discloses a capacitive type coupling data transmission system for portable electronic apparatus comprised of an input circuit, a capacitance changing circuit, a transmitting circuit capacitively coupled to a receiving circuit, and a detecting circuit for detecting any change in the capacitance changing circuit. A data signal to be transmitted is inputted into the input circuit. Based on the value of an inputted binary digital data signal, the capacitance of the capacitance changing circuit is changed. The capacitance change is capacitively transmitted from the transmitting circuit to the receiving circuit and detected thereat. The detecting circuit may be an oscillator circuit, a an RC differentiating circuit, or an RC integrating circuit.

U.S. Pat. No. 7,877,123 to Abdul-Gaffoor et al. discloses methods and apparatuses for RF signal transmission between the fixed base portion and the sliding portion of a mobile communication terminal using capacitive coupling. The methods and apparatuses provide internal RF signal transmission when the sliding portion is open and when the sliding portion is closed. The method for internal RF signal transmission in a mobile communication terminal includes a first capacitor plate for forming a first capacitor when the two parts are at a first position relative to each other and for forming a second capacitor when the two parts are at a second position relative to each other.

Despite the existence of these technologies, there remains a need for improved systems, methods and apparatuses of wireless communication which are not dependent on modulation or induction, which do not require the existence of common wires or ground, which are low-power, and which are capable of very high-speed data transmission.

The present disclosure describes apparatuses, methods and systems for the high-speed, wireless transmission of data between two adjacent electronic devices. For example, it may be desirable to wirelessly transmit uncompressed video data between a smart phone placed on, near or adjacent to a laptop computer. If both the smart phone and the laptop are configured according to certain embodiments of the present disclosure, the smart phone may transmit the uncompressed video data to the laptop in real-time. Other non-limiting examples include using the apparatuses, methods and systems disclosed herein for the transmission of data from a camera to a smart phone, from a camera to a computer, or between two smart phones.

A wireless transmission system may first comprise a transmitting apparatus configured to transmit a data stream, where the transmitting apparatus comprises at least a signal preparer for receiving the data stream and at least two transmitting terminals separated in space from each other. Each of the transmitting terminals may be coupled to the signal preparer such that the first transmitting terminal receives a first electric signal representative of the data stream, and the second transmitting terminal receives a second electric signal that is identical to the first electric signal except that it is in the opposite polarity, and such that a correspondent electric field is emanated by each transmitting terminal. The wireless transmission system may further comprise a receiving apparatus, the receiving apparatus comprising at least two receiving terminals separated in space from each other and a data stream restorer. Each receiving terminal of the receiving apparatus may be coupled to the data stream restorer.

In a system according to the present disclosure, the transmitting apparatus may be oriented with respect to the receiving apparatus such that at least one nonconductive material separates the two apparatuses, and such that the first receiving terminal is capable of detecting the electric field emanated by the first transmitting terminal and the second receiving terminal is capable of detecting the electric field emanated by the second transmitting terminal. In turn, these detections induce corresponding signals on the first and second receiving terminal, whereby the signal induced on the first receiving terminal corresponds to the first electric signal representative of the data stream, and the signal induced on the second receiving terminal corresponds to the second electric signal. Each of the signals received on the first and second receivers may be combined by the data stream restorer to produce a received data stream.

A method of wireless communication according to the present disclosure may comprise orienting a transmitting apparatus with respect to a receiving apparatus such that at least one nonconductive material separates the two apparatuses. The transmitting apparatus may have at least a signal preparer coupled to the data stream intended for transmission and at least two transmitting terminals separated in space from each other. The receiving device may have at least a first and a second receiving terminal and a data stream restorer. The method may further comprise providing a data stream to the signal preparer, and causing the signal preparer to produce a first electric signal representative of the data stream and a second electric signal identical to the first, but having the opposite polarity. The first and second electric signals may be provided to the first and second transmitting terminals, respectively, causing each transmitting terminal to emanate an electric field. The method may further comprise detecting the first electric field on the first receiving terminal and the second electric field on the second receiving terminal. In turn the detection of the signals induces corresponding signals on the first and second receiving terminals, whereby the signal induced on the first receiving terminal corresponds to the first electric signal representative of the data stream, and the signal induced on the second receiving terminal corresponds to the second electric signal. The method may further comprise combining each of the signals received on the first and second receiving terminals to produce a received data stream. Such combining may be implemented, for example, as signal subtracting.

Non-limiting and non-exhaustive embodiments of the present invention are described with reference to the following figures.

The present invention comprises apparatuses, methods and systems for the short-range wireless transmission of data between two adjacent electronic devices, such as two smart phones or a camera and a laptop. At least one of the two devices is coupled to a transmitting apparatus of the invention, and at least one of the devices is coupled to a receiving apparatus of the invention. However, a person having ordinary skill in the art will understand that each of the devices could be configured to contain both a transmitting apparatus and a receiving apparatus so as to enable two-way communications between the adjacent devices.

The systems, methods and apparatuses described herein permit the transmission of any kind of data from one device to another, regardless of how that data is originally packaged. For example, according to the present disclosure, songs encoded as MP3s, or videos encoded as MPEG-4s, may be transmitted. In one embodiment, before a transmission apparatus begins processing any data for transmission to a receiving apparatus, the data may be transformed into a sequence of binary digits, such that the actual data stream to be transmitted from one device to another is represented by a stream of 1s and 0s. The present disclosure imposes no requirements as to the specific nature or protocol of this transformation.

Figure 1:
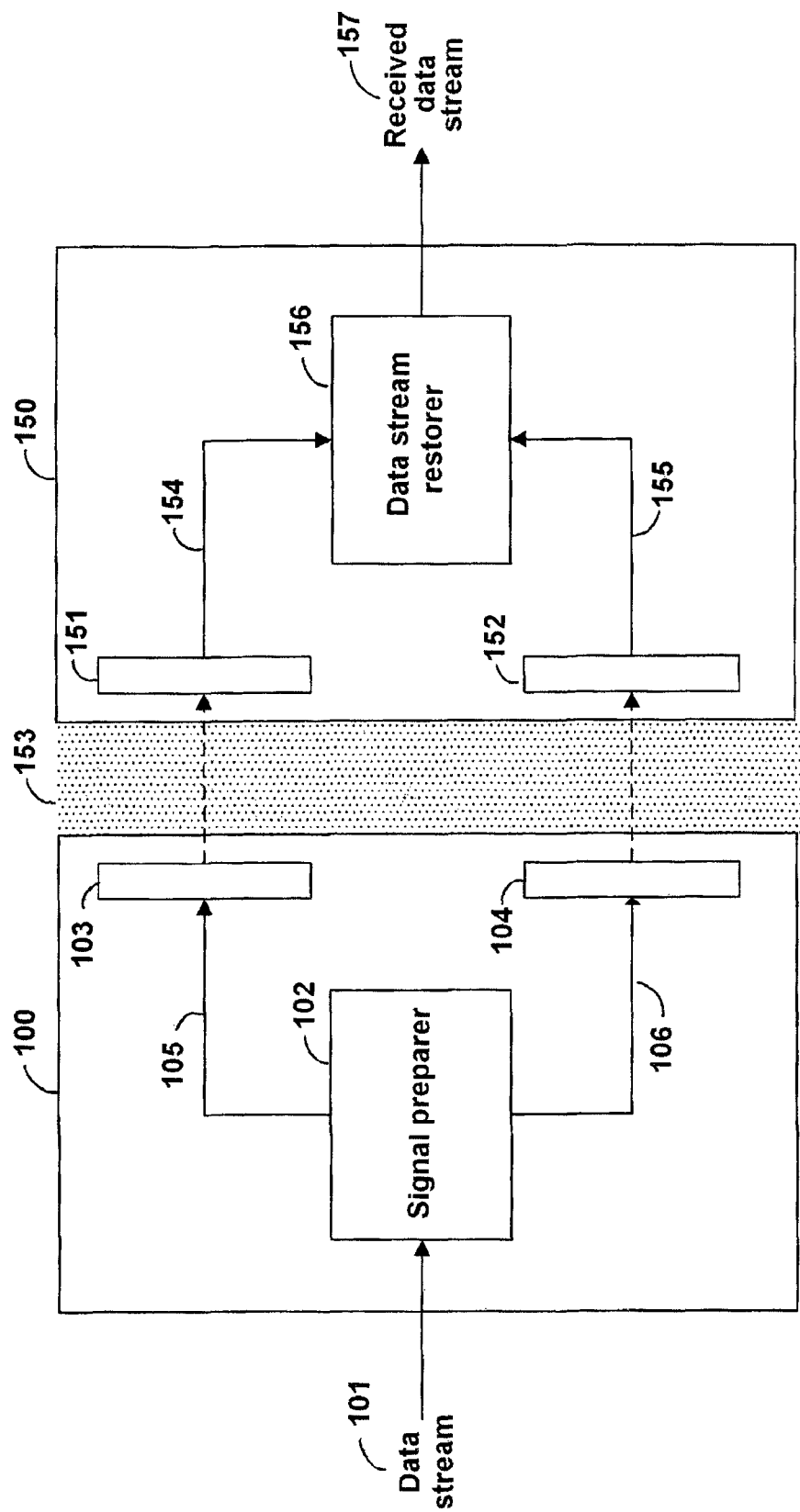
FIG. 1 is a block diagram of a transmitting apparatus oriented with respect to a receiving apparatus.

In one embodiment, as illustrated in FIG. 1, within a transmitting apparatus 100, a data stream 101 is coupled to a signal preparer 102. As used herein, the term "signal preparer" refers to both hardware- and software-implemented aspects for inputting a data stream 101, and outputting two electric signals to each of a first transmitting terminal 103 and a second transmitting terminal 104 as described in further detail herein. The data stream 101 is split into two signals for the purpose of improving signal quality on a receiving apparatus; this split may reduce overall power loss and may further reduce any data errors which could be introduced by noise or other factors during transmission, a process which is described in further detail below.

The first output 105 of the signal preparer 102 is an electric signal representative of the data stream 101 (hereinafter the "repeated signal"). The second output 106 is an electric signal also representative of the data stream 101, but having the opposite polarity of the first electric signal 105, i.e., an inverted signal. In other words, if the repeated signal were represented on a graph with x and y axes, the inverted signal would be identical to the repeated signal except that it would be rotated 180 degrees about the x-axis. Mathematically, this could be conceived as multiplication of the repeated signal by "−1".

In one embodiment, the signal preparer 102 creates the inverted signal 106 and the repeated signal 105 such that they are substantially in-phase. In other words, to the extent the process of creating an inverted signal 106 may take a finite amount of time, the repeated signal 105 may be created such that it is delayed by the same amount of time. The resulting effect is that when the signals 105, 106 leave the duplicator 303 they are in sync such that one exactly reflects the inverse of the other. Specific exemplary embodiments of a signal preparer 102 are discussed in greater detail below.

The signal preparer 102 may be coupled to a first transmitting terminal 103 and a second transmitting terminal 104 such that the repeated signal 105 is provided to the first transmitting terminal 103 and the inverted signal 106 is provided to the second transmitting terminal 104. The first transmitting terminal 103 may emanate an electric field representative of the repeated signal 105 and the second transmitting terminal 104 may emanate an electric field representative of the inverted signal 106.

Each transmitting terminal 103, 104 may be configured in any shape and comprising any conductive material. For example, in one embodiment, each transmitting terminal 103, 104 is a flat, rectangular or square, metal plate. In another embodiment, each transmitting terminal 103, 104 is a circular, metal plate. However, one having ordinary skill in the art will understand that each transmitting terminal 103, 104 may be of any suitable shape and material to enable it to emanate an electric field as further described herein.

Also as shown in FIG. 1, a receiving apparatus 150 may possess a first receiving terminal 151 and a second receiving terminal 152. Each receiving terminal 151, 152 may be configured in any shape and comprising any conductive material. For example, in one embodiment, each receiving terminal 151, 152 is a flat, rectangular or square, metal plate. In another embodiment, each receiving terminal 151, 152 is a circular, metal plate. However, one having ordinary skill in the art will understand that each receiving terminal 151, 152 may be of any suitable shape and material to enable it to receive an electric field as described herein.

The receiving apparatus 150 may be located with respect to the transmitting apparatus 100 as pictured on FIG. 1, such that one or more nonconductive materials 153—such as, but not limited to, air, plastic, glass or paper—prevents the transmitting terminals 103, 104 from directly touching the receiving terminals 151, 152.

In this configuration, if the transmitting apparatus 100 is sufficiently close to the receiving apparatus 150, when a data stream 101 is conveyed (via the signal preparer 102, and in the form of the repeated signal 105 and inverted signal 106) to the two transmitting terminals 103, 104, each of the transmitting terminals 103, 104 will act as a first capacitor plate, the nonconductive material(s) 153 will act as a dielectric, and each of the receiving terminals 151, 152 will act as a second capacitor plate.

Figure 2:
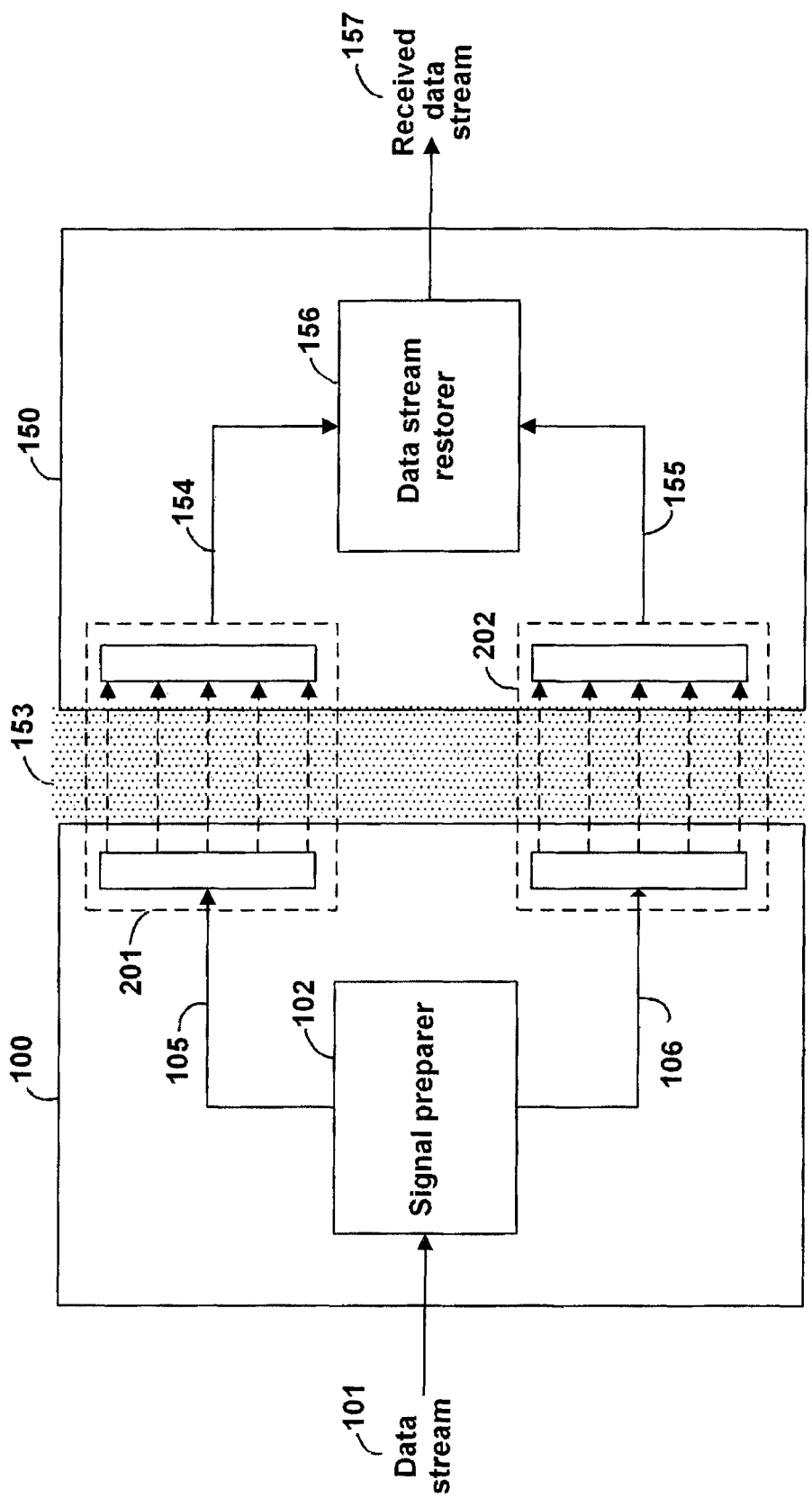
FIG. 2 is a block diagram of a transmitting apparatus oriented with respect to a receiving apparatus, illustrating two virtual capacitors.

In other words, as shown in FIG. 2, transmitting terminal 103 and receiving terminal 151 create a "virtual capacitor" 201, and transmitting terminal 104 and receiving terminal 152 create a "virtual capacitor" 202. Setting aside noise and other issues which may be presented by the environment surrounding the two devices, the potential induced on the first receiving terminal 151 correlates to the repeated signal 105 (hereinafter the "received repeated signal" 154), and the potential induced on the second receiving terminal 152 correlates to the inverted signal 106 (hereinafter the "received inverted signal" 155).

Cell ph→docking station In this manner, data may be conveyed from one device as a result of capacitance. This use of capacitance, requiring the existence of a nonconductive dielectric 153 means, for example, that a transmission apparatus 100 could be located entirely within the enclosure of a smart phone and a receiving apparatus 150 could be incorporated within the enclosure of a docking station. The dielectric 153 between the two apparatuses 100, 150 would comprise first enclosure (made of any suitable nonconductive material from which phone enclosures are made), then air, and then another enclosure. In this manner, both phone and docking station could be completely and hermetically sealed. Alternatively, the phone and docking station may be touching each other, such that the dielectric 153 between the two apparatuses 100, 150 would be the enclosures of the devices. It is permissible for the apparatus enclosures to be made of metal or other conductive material so long as the portion of the enclosure that comes into contact with and/or covers the transmitting terminals 103, 104 or the receiving terminals 151, 152 is made of a non-conductive material (i.e., is not metal or another conductive material) to act as a dielectric between the terminals.

Unlike many systems which are using radio frequency, a capacitive system according to the present disclosure does not require any resonance between the two devices. Similarly, a capacitive system according to the present disclosure does not restrict maximum frequency or require modulation, and therefore there are few, if any, limitations on frequency or possible bitrates. As an illustration, in one embodiment of the present disclosure it may be possible to transmit uncompressed video from one device to another in real time, which corresponds to a data rate of gigabits per second. By contrast, electromagnetic field-based technologies, such as near field communications, permit only megabits per second, a difference of 1,000. Unlike other systems which are based on capacitance, however, in this case the overall system capacitance is not necessarily representative of the information being transmitted. In other words, data is not transmitted as a function of whether the virtual capacitors 201, 202 have a higher or lower overall capacitance, so that one value of capacitance would result in the receiving device "seeing" a 1 or a 0, respectively. In fact, because this is a real-life system in a non-ideal environment, it could easily be the case that the capacitance would not be stable, because of, for example, vibration changing the distance between the devices. Rather, in the present disclosure, the induced potential on a terminal 151, 152 of the receiving apparatus 150 is directly representative of the transmitted signals.

Also unlike some other capacitively coupled systems, the present disclosure does not necessarily require common power or common ground between the two apparatuses 100, 150. That is, there does not necessarily need to be any wires between the two apparatuses 100, 150, or between each of the apparatuses 100, 150 and actual (i.e., physical) ground. We also note that in the present disclosure, the generated electric fields are considered uniform, and there is no need to measure field gradient, which requires complicated techniques and reduces throughput.

Also as depicted in FIG. 1, the receiving apparatus 150 may further comprise a data stream restorer 156. The purpose of the data stream restorer 156 is to combine the received repeated signal 154 and the received inverted signal 155—two electric signals—to produce a received data stream 157, such that the received data stream 157 is essentially a copy of the original data stream 101. In one embodiment such combining can be implemented as subtracting received inverted signal 155 from received repeated signal 154. As discussed previously with respect to the transmitting apparatus, the purpose of using two received signals 154, 155 is to reduce data errors which may have been introduced with respect to one or both of the signals during transmission as a result of noise or other factors. The data stream restorer 156 may be directly coupled to the two receiving terminals 151, 152. Specific exemplary embodiments of a data stream restorer 156 are discussed in greater detail below.

The various elements of the transmitting and receiving apparatuses 100, 150 may be physically oriented largely as dictated by the overall constraints of the respective devices to which the apparatuses 100, 150 are coupled. For example, there are no specific requirements regarding the placement of the first transmitting terminal 103 with respect to the second transmitting terminal 104, as long as the two terminals are not positioned such that one blocks the other or such that the electric field generated by one would interfere with the electric field generated by the other. In one embodiment the two transmitting terminals 103, 104 may be oriented such that they are in the same plane, but there is no requirement that they be oriented in this manner. In addition, there is no requirement that the transmitting terminals 103, 104 be placed in close proximity to each other within the transmitting apparatus; rather, they may be separated as far from each other as appropriate for the overall system.

Similarly, there are no specific requirements regarding the placement of the first receiving terminal 151 with respect to the second receiving terminal 152 as long as the two terminals are not positioned such that one blocks the other or such that the received electric fields interfere with each other. In one embodiment the two receiving terminals 151, 152 may be oriented such that they are in the same plane, but there is no requirement that they be oriented in this manner. Similarly, there is no requirement that the receiving terminals 151, 152 be placed in close proximity to each other within the receiving apparatus 150. It is, however, generally preferable to place the receiving terminals 151, 152 within the receiving apparatus 150 in the same configuration as the transmitting terminals 103, 104 have been placed within the transmitting apparatus 100 to ensure that it is physically possible to create two virtual capacitors 201, 202.

In one non-limiting embodiment, it may be desirable to use circular transmitting terminals 103, 104 and circular receiving terminals 151, 152, each measuring 3 mm in diameter, and placed directly facing each other. However, there is no requirement that the transmitting terminals 103, 104 and receiving terminals 151, 152 are the same size. Thus, in another embodiment, it may be desirable, for example, to use circular transmitting terminals 105, 106 measuring 2 mm in diameter, and circular receiving terminals 151, 152 measuring 8 mm in diameter (it might be useful for reducing emissions, if relative position of apparatuses is not one hundred percent exact). It is desirable that terminals 103, 151 are approximately parallel to each other. While it is not an absolute requirement, efficiency of the system is decreased when the angle between aforementioned terminals increases (system will become completely not working, if terminals are orthogonal). The same is true for another pair of terminals 104, 152.

It is generally preferable to place the two apparatuses 100, 150 such that the total distance between the transmitting terminals 103, 104 and the receiving terminals 151, 152 is less than or equal to the diameter of the smallest of the terminals. In the immediately foregoing example, where the terminals are of different sizes, it may be desirable to place the two apparatuses 100, 150 such that the transmitting terminals 103, 104 and receiving terminals 151, 152 are roughly 2 mm apart. However, one having ordinary skill in the art will understand that it may be possible to place the two apparatuses 100, 150 further apart depending on the characteristics of the overall system. This also means it is possible to have the two devices in which apparatuses 100, 150 are located physically contacting each other as long as transmitting terminals 103, 104 and receiving terminals 151, 152 are not touching. For example, two smart phones enclosed in plastic cases might be touching, plastic case to plastic case, but the conductive transmitting terminals 103, 104 and receiving terminals 151, 152 may be placed under the surface of their respective phone cases. In this manner, even when the phones are touching, the conductive terminals themselves could be 2 mm (or whatever distance is appropriate) apart.

Figure 3A:
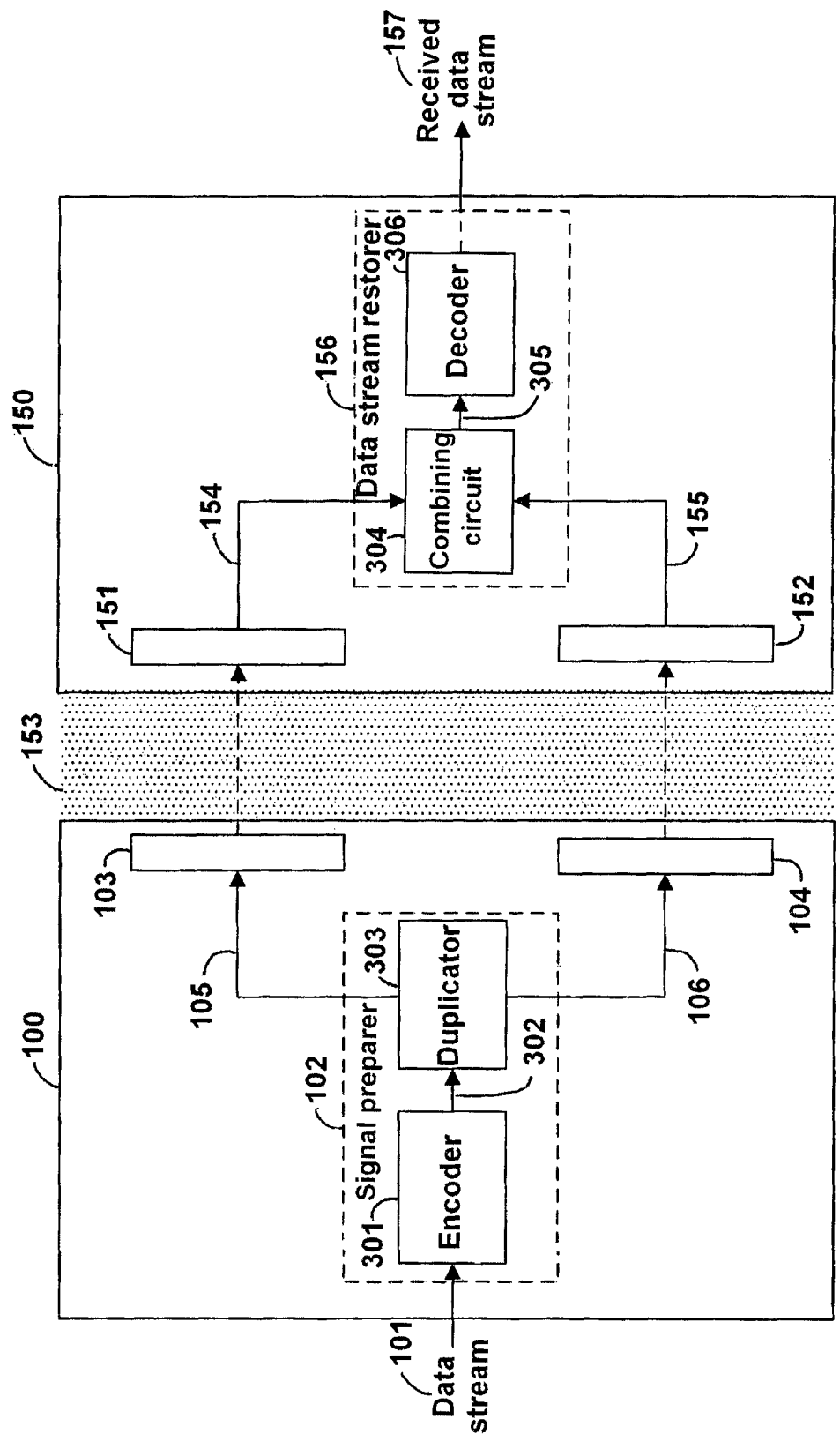
FIG. 3A is a block diagram of an exemplary primarily analog implementation of the embodiment of FIG. 1.

FIG. 3A is a block diagram of an exemplary primarily analog implementation of the system shown in FIG. 1. As shown on FIG. 3A, the signal preparer 102 may incorporate an encoder 301 which may be comprised of one or more modules for encoding the data stream 101. One having ordinary skill in the art will understand that an encoder 301 may be any suitable hardware- or software-based mechanism for converting data from one format to another. Encoding may be used in order to reduce error rate on the receiving side in order to improve the quality of signal transmission.

Depending on the overall system constraints, it may be possible to process the data stream 101 to minimize long sequences of '0's and '1's before the data stream 101 is provided to the signal preparer 102. Alternatively, it may be desirable to use the encoder 301 to minimize long sequences of the same digit using coding techniques. It may also be desirable to have the encoder 301 perform some or all of the line coding. For example, it is known that line codes (such as Manchester code or 8b/10b code) eliminate such long sequences of 0s and 1s, essentially reducing errors described above. Thus, in one exemplary embodiment, an encoder 301 may take the form of programmable circuitry which has been pre-programmed to line code the data stream 101 in conjunction with a clock signal (not shown). It is to be understood, however, that any type of suitable coding may be used and the invention is not limited to the use of line codes or Manchester code in particular. In the primarily analog implementation of FIG. 3A, the input into the encoder is a bit stream of 1s and 0s and the output is an electrical signal 302 representative of the encoded bit stream.

The signal preparer 102 may further comprise a duplicator 303 which may receive the encoded electrical signal 302 and produce two electric signals, such as the repeated signal 105 and the inverted signal 106. In one exemplary embodiment, a duplicator 303 may be implemented using a single-transistor inverter circuit (sometimes also known as an inverter-repeater). In another embodiment, a duplicator 303 may comprise two or more separate units. A person having ordinary skill in the art will understand that the production of the repeated signal 105 and the inverted signal 106, based on the incoming encoded signal 302, may be accomplished by any suitable means.

In an implementation according to FIG. 3A, the data stream restorer 156 may comprise a combining circuit 304. The combining circuit 304 may receive two electrical signals as inputs, such as the received repeated signal 154 and the received inverted signal 155, and produce a single electric signal as an output (the "combined received signal") 305. As used herein, the term "combining circuit" refers to any suitable hardware- or software-based implementation, such as a summing network of resistors, a differentiator, a comparator or any other appropriate hard-wired or programmable circuitry. In one exemplary embodiment, the combining circuit 304 may be implemented using a two-transistor comparator. As also shown in FIG. 3A, the data stream restorer 156 may further include a decoder 306 which may be comprised of one or more modules for decoding the combined received signal 305. In one exemplary embodiment, a decoder 306 might be coupled to a combining circuit 304, such that the decoder 306 receives the combined received signal 305 and produces the received data stream 157, i.e. a decoded version of the original data stream 101. A person having ordinary skill in the art will understand that the decoder may be implemented in either hardware or software, or a combination of both, so long as it is capable of extracting data encoded by the encoder 301.

Figure 3B:
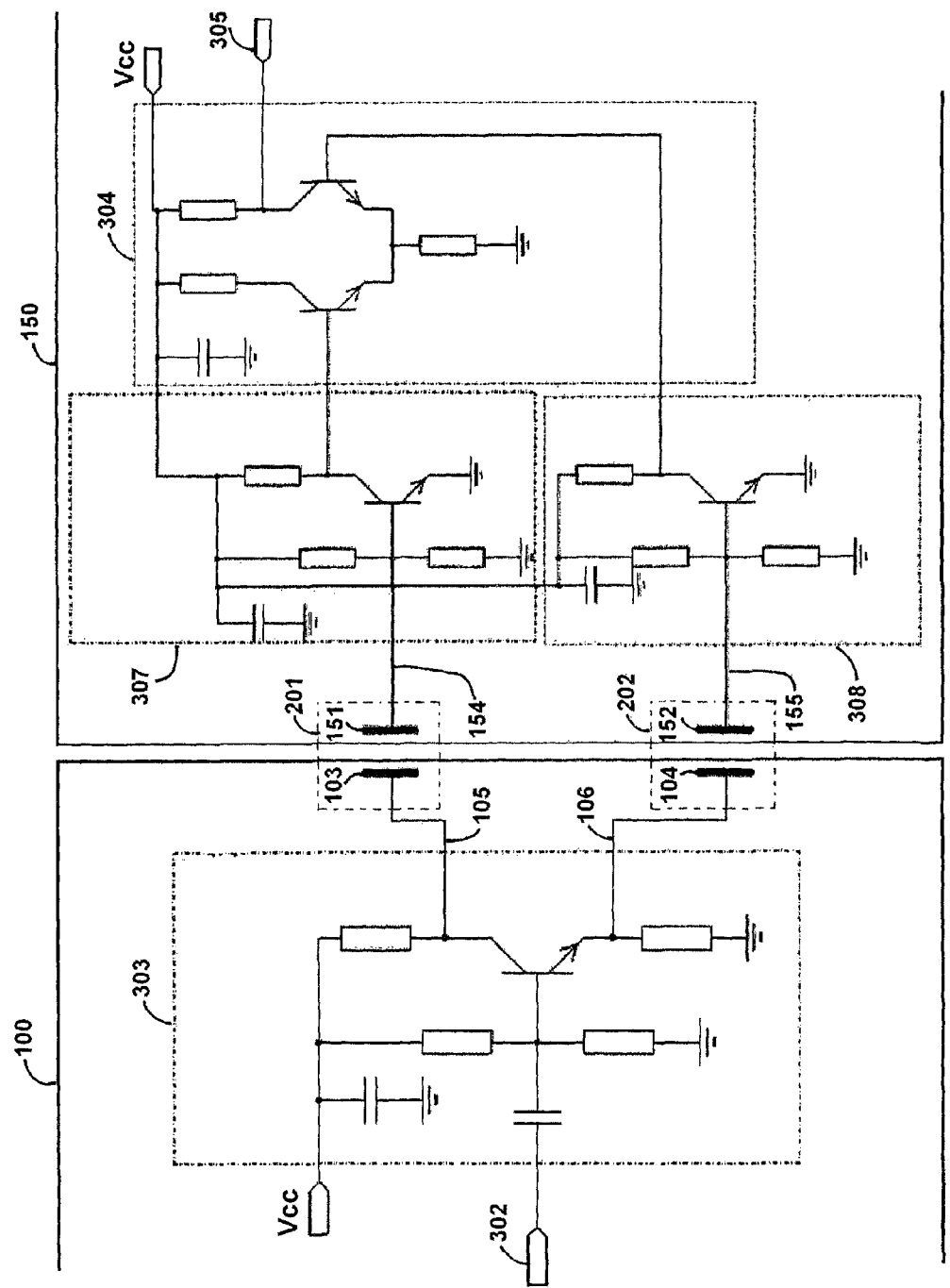
FIG. 3B is a schematic showing selected components of the exemplary primarily analog implementation of the embodiment shown in FIG. 3A.

FIG. 3B is an electrical schematic showing one exemplary combination of circuit elements capable of implementing selected components of the analog implementation shown in FIG. 3A. In this exemplary embodiment, the duplicator 303 is implemented by a simple, one-transistor inverter/repeater circuit. On the receiving side, the received repeated signal 154 and received inverted signal 155 may be amplified by common emitter, single-transistor amplifiers, shown as 307 and 308. Finally, the combining circuit 304 may be implemented using a two-transistor comparator. Anyone having ordinary skill in the art will, however, understand that this is just one of many possible implementations of the embodiment logically depicted on FIG. 3A.

Figure 4:
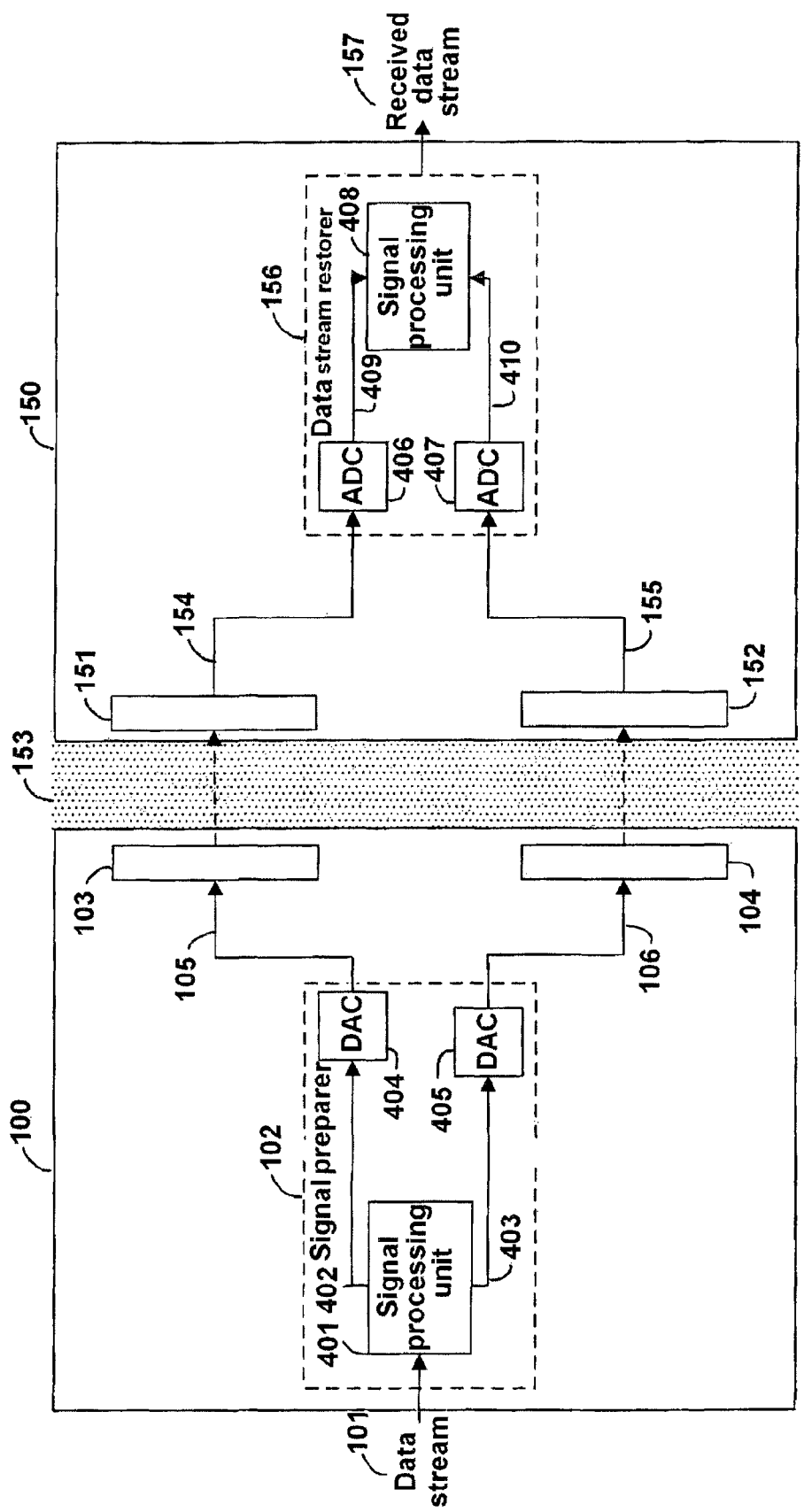
FIG. 4 is a block diagram of an exemplary primarily digital implementation of the embodiment of FIG. 1.

FIG. 4 shows a block diagram of a primarily digital implementation of the system shown in FIG. 1. In one such embodiment, the signal preparer 102 may comprise a first signal processing unit 401. The signal processing unit 401 may be any form of hardware- or software-based mechanism for producing two derived digital streams 402, 403 based on the data stream 101 such as, by way of non-limiting example, a programmable general purpose processor, a specialized processor, an application specific integrated circuit (ASIC), and may include memory as needed to store any implementing software.

As in the case of the analog embodiments described with respect to FIG. 3, it may be desirable to use coding techniques to promote error rate. In one embodiment, the signal processing unit 401 may line code the data stream 101 as part of producing the two derived digital streams 402, 403. The two derived digital streams 402, 403 generated by the signal processing unit 401 may then be coupled to two digital-to-analog converters 404, 405, such that the output of the first digital-to-analog converter 404 is the (electric) repeated signal 105, and the output of the second digital-to-analog converter 405 is the (electric) inverted signal 106. As used herein, the term "digital-to-analog converter" refers to any hardware- or software-based mechanism for converting digital data into a physical quantity.

One having ordinary skill in the art will understand that the processing required to create the repeated signal 105 and the inverted signal 106 may be distributed between the signal processing unit 401 and the digital-to-analog converters 404, 405. For example, in one embodiment of the invention, the digital-to-analog converters 404, 405 are substantially identical in that for a given input they have a substantially identical output. The signal processing unit 401 is responsible for the processing is necessary to create derived digital streams 402 and 403, such that when the derived digital streams 402, 403 are put through the substantially identical digital-to-analog converters 404, 405, the output of the converters are identical but in opposite polarity.

In an alternate embodiment of the invention, the digital-to-analog converters 404, 405 may be slightly different, such that the second digital-to-analog converter 405 is responsible for reversing the polarity of the derived digital stream 403 in addition to creating an electric signal. In one such embodiment, the first digital-to-analog converter 404 may be configured such that an input 402 of '0' produces a repeated signal 105 measuring 0 volts, and an input 402 of '1' produces a repeated signal 105 measuring some fixed, positive voltage. The second digital-to-analog converter 405 may be configured such that an input 403 of '0' results in an inverted signal 106 measuring 0 volts, and an input 403 of '1' produces an inverted signal 106 measuring a fixed, negative voltage. The maximum output voltage of both converters 404, 405 would be the same, i.e. the absolute value of the output voltage corresponding to an input value of '1' in the second digital-to-analog converter 405 is equal to the output voltage corresponding to an input value of '1' in the first digital-to-analog converter 404. In such an embodiment, the derived digital streams 402, 403 would be identical, but the output of the digital-to-analog converters 404, 405 would be such that the electrical signal 106 would be in the opposite polarity to the electrical signal 105.

On the receiving side of such an embodiment, the data stream restorer 156 may comprise two analog-to-digital converters 406, 407 coupled to a second signal processing unit 408, which collectively accomplish the function of receiving two electric signals, such as the received repeated signal 154 and the received inverted signal 155, and producing a digital received data stream 157.

As used herein, the term "analog-to-digital converter" refers to any hardware- or software-based mechanism for converting an electric signal, such as a voltage, into a bit stream.

In one exemplary embodiment, the analog-to-digital converters 406, 407 may have 8-bit resolution, such that the output 409, 410 of the two analog-to-digital converters 406, 407 is not binary, but instead will range from '0' to '255'. In such an embodiment, it is expected that the output 409 of the first analog-to-digital converter 406 will range from '0' to '255', depending on the voltage of the received repeated signal 154. Similarly, it is expected that the output 410 of the second analog-to-digital converter 407 will range from '0' to '255', depending on the voltage of the received inverted signal 155. In such a manner, both the received repeated signal 154 and received inverted signal 153 may be converted to digital sequences of numbers between '0' and '255'. Notwithstanding the foregoing examples, one having ordinary skill in the art will understand that 8-bit resolution is not required, and that higher or lesser resolution may be appropriate in light of the overall system characteristics. One having ordinary skill in the art will further understand that alternative mechanisms exist for implementing analog-to-digital converters which are suitable for the present purpose.

As described above, within the data stream restorer 156, the output of the two analog-to-digital converters 406, 407 is provided to a second signal processing unit 408. The signal processing unit may output the received data stream 157 based on the difference between outputs 409, 410 of the ADCs 406, 407. This signal processing unit 408 may be any form of hardware- or software-based mechanism for receiving two electrical signals and producing a data stream, such as, by way of non-limiting example, a programmable general purpose processor, a specialized processor, an application specific integrated circuit (ASIC), and may include memory as needed to store any implementing software.

Figure 5:
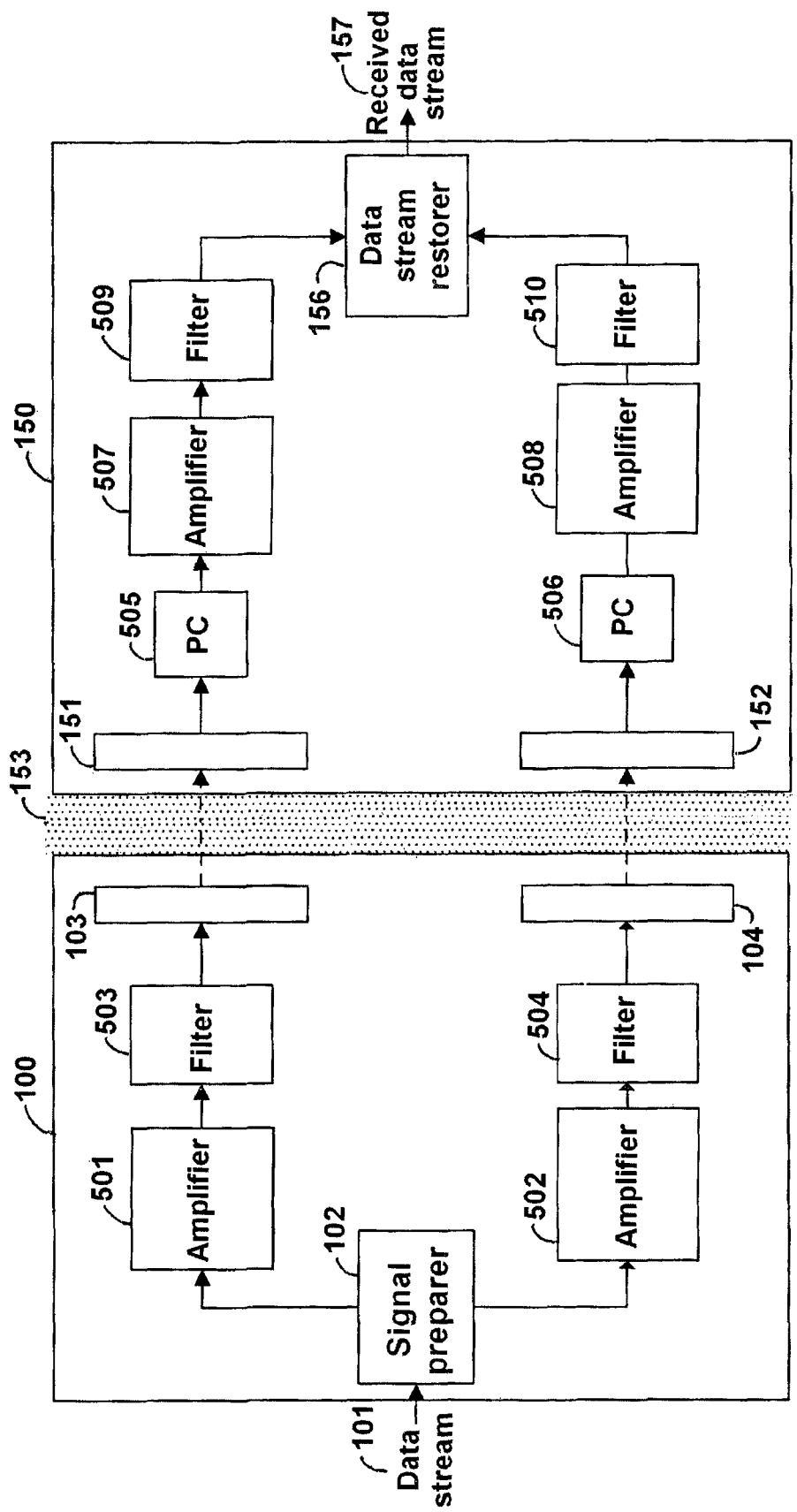
FIG. 5 is a block diagram of a transmitting apparatus and a receiving apparatus illustrating additional, optional elements.

FIG. 5 depicts another alternative embodiment—irrespective of the type of processing applied to the data stream 101, i.e., primarily analog or primarily digital—reflecting multiple additional, optional elements. Depending on the distance between the two apparatuses 100, 150 and the nature of the operating environment, it may be desirable to use amplifiers and/or filters before and/or after transmission of the repeated signal 105 and the inverted signal 106. Amplifiers 501, 502 may be coupled to the signal preparer 102 such that both the repeated signal 105 and the inverted signal 106 are amplified before reaching the transmission terminals 103, 104. As used herein, the term "amplifier" refers to any suitable mechanism of increasing the amplitude or power of a signal, including, by way of non-limiting example, transistor amplifiers, op-amps, fully differential amplifiers and diode amplifiers. In one exemplary embodiment, the two amplifiers 501, 502 are implemented by common emitter, single-transistor amplifiers.

The repeated signal 105 and the inverted signal 106 may additionally pass through output filters 503, 504 before reaching the transmission terminals 103, 104. As used herein, the term "output filter" refers to any hardware- or software-based element suitable for the purpose of changing certain characteristics of the signal (for example, it can be used to change shape of the signal from rectangular to trapezoidal to reduce high frequency spectrum components). In general, these amplifiers 501, 502 and output filters 503, 504 are optional elements for the purpose of improving signal quality prior to transmission.

Depending on the overall system environment, it may be useful to include protective circuits to protect components in the receiving apparatus 150 from voltage levels (for example, those arising from static charge on the surface of nonconductive cover), which could be damaging. In the embodiment shown in FIG. 5, two protective circuits 505, 506 are coupled to the receiving terminals 151, 152, such that all subsequent elements are protected from damage. One having ordinary skill in the art will understand that a protective circuit 505, 506 may be, for example, implemented using Zener diode.

It may also be useful to amplify signals on the receiving side before performing further signal processing. Thus, as shown in FIG. 5, the receiving apparatus 150 may comprise amplifiers 507, 508 and input filters 509, 510. As used herein the input filters are suitable for the purpose of filtering any noise or unwanted frequencies introduced by the environment, the process of transmission and/or amplification As before, each of these amplifiers 507, 508 and input filters 509, 510 are optional elements for the purpose of improving the quality of signal transmission.

Those with ordinary skill in the art also understand that a system that combines the various implementations discussed above could also be constructed or used. For example, the transmitting apparatus may use an analog implementation for processing the data stream into electrical signals while a receiving apparatus may use a digital implementation for processing the received electrical signals into a received data stream, or vice versa. Indeed, as the disclosure is idea for transferring data streams between devices that may be owned by different people, there is no guarantee that the receiving and transmitting apparatuses use the same methodology for processing the electrical signals and data streams. As long as the transmitting and receiving apparatus use the same encoding/decoding technique, they can choose any implementation to effectuate that technique.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. For example, the various optional elements discussed herein, such as signal preparers, data stream restorers, encoders, amplifiers, filters and protective circuits, may be mixed and combined as required for each particular application.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

The invention claimed is:

1. A wireless transmission system comprising:
  a transmitting apparatus configured to transmit a data stream comprising:
    a signal preparer coupled to the data stream and configured to produce a repeated signal and an inverted signal;
    a first transmitting terminal coupled to the signal preparer such that the first transmitting terminal emanates an electric field representative of the repeated signal; and
    a second transmitting terminal separated in space from the first transmitting terminal and coupled to the signal preparer such that the second transmitting terminal emanates an electric field representative of the inverted signal;
  a receiving apparatus comprising:
    a first receiving terminal capable of detecting the electric field emanated by the first transmitting terminal, which detection induces a received repeated signal on the first receiving terminal;

a second receiving terminal separated in space from the first receiving terminal and capable of detecting the electric field emanated by the second transmitting terminal, which detection induces a received inverted signal on the second receiving terminal; and a data stream restorer, each of such receiving terminals coupled to the data stream restorer such that the received repeated signal and the received inverted signal are combined to produce a received data stream;

wherein each of the transmitting apparatus and the receiving apparatus is contained in a separate device such that at least one nonconductive medium separates the transmitting apparatus from the receiving apparatus, the nonconductive medium not belonging to the transmitting apparatus, the elements of the transmitting apparatus, the receiving apparatus, or the elements of the receiving apparatus.

2. The system of claim 1 wherein at least one of the first transmitting terminal and the second transmitting terminal is smaller than at least one of the first receiving terminal and the second receiving terminal.

3. A method for wirelessly transmitting a data stream between a transmitting apparatus and a receiving apparatus, the transmitting apparatus comprising a signal preparer, a first transmitting terminal and a second transmitting terminal, and the receiving apparatus comprising a first receiving terminal and a second receiving terminal, each of the transmitting apparatus and the receiving apparatus contained in a separate device, the method comprising:

orienting the transmitting apparatus with respect to the receiving apparatus such that at least one nonconductive material separates the first and second transmitting terminals from the first and second receiving terminals, the nonconductive medium not belonging to the transmitting apparatus, the elements of the transmitting apparatus, the receiving apparatus, or the elements of the receiving apparatus, providing a data stream to the signal preparer, causing the signal preparer to produce a repeated signal and an inverted signal;

providing the repeated signal to the first transmitting terminal, causing the first transmitting terminal to emanate a first electric field representative of the repeated signal; and providing the inverted signal to the second transmitting terminal, causing the second transmitting terminal to emanate a second electric field representative of the inverted signal.

4. The method of claim 3 further comprising amplifying at least one of the repeated signal and the inverted signal prior to provision to at least one of the first transmitting terminal and the second transmitting terminal.

5. The method of claim 4 further comprising filtering at least one of the repeated signal and the inverted signal prior to provision to at least one of the first transmitting terminal and the second transmitting terminal.

6. A method for wirelessly receiving a signal comprising:

orienting a receiving apparatus, the receiving apparatus comprising a first receiving terminal and a second receiving terminal, with respect to a transmitting apparatus, the transmitting apparatus comprising a first transmitting terminal and a second transmitting terminal, such that at least one nonconductive medium separates the first and second transmitting terminals from the first and second receiving terminals, the nonconductive medium not belonging to the transmitting apparatus, the elements of the transmitting apparatus, the receiving apparatus, or the elements of the receiving apparatus;

detecting a first electric field on the first receiving terminal, inducing a received repeated signal on the first receiving terminal;

detecting a second electric field on the second receiving terminal, inducing a received inverted signal on the second receiving terminal; and combining the received repeated signal and the received inverted signal to produce a received data stream, wherein the receiving apparatus and the transmitting apparatus are each contained in a separate device.

7. The method of claim 6 further comprising amplifying at least one of the received repeated signal and the received inverted signal prior to combining the received repeated signal and the received inverted signal.

8. The method of claim 7 further comprising filtering at least one of the repeated signal and the inverted signal prior to combining the received repeated signal and the received inverted signal.

9. The method of claim 6 further comprising protecting one or more components of the receiving apparatus from predetermined voltage levels which may damage one or more components of the receiving apparatus.

10. The method of claim 6 further protecting one or more components of the receiving apparatus from predetermined current levels which may damage one or more components of the receiving apparatus.

11. A transmitting apparatus for wirelessly transmitting a data stream comprising:

a signal preparer coupled to the data stream and configured to produce a repeated signal and an inverted signal;

a first transmitting terminal coupled to the signal preparer such that the first transmitting terminal emanates an electric field representative of the repeated signal; and a second transmitting terminal separated in space from the first transmitting terminal and coupled to the signal preparer such that the second transmitting terminal emanates an electric field representative of the inverted signal, wherein the transmitting apparatus is oriented with respect to a receiving apparatus such that at least one nonconductive medium separates the transmitting apparatus from the receiving apparatus, the nonconductive medium not belonging to the transmitting apparatus, the elements of the transmitting apparatus, the receiving apparatus, or the elements of the receiving apparatus, and wherein each of the transmitting apparatus and the receiving apparatus is contained in a separate device.

12. The transmitting apparatus of claim 11 further comprising at least one amplifier such that at least one of the repeated signal and the inverted signal is amplified before being received by at least one of the first transmitting terminal and the second transmitting terminal.

13. The transmitting apparatus of claim 12 further comprising at least one filter such that at least one of the repeated signal and the inverted signal is filtered before being received by at least one of the first transmitting terminal and the second transmitting terminal.

14. The transmitting apparatus of claim 11 wherein the signal preparer comprises a duplicator.

15. The transmitting apparatus of claim 14 wherein the signal preparer further comprises an encoder such that the data stream is encoded before it is received by the duplicator.

16. The transmitting apparatus of claim 15 wherein the encoder is a line coder.

17. The transmitting apparatus of claim 11 wherein the signal preparer comprises a first signal processing unit coupled to at least two digital-to-analog converters.

18. The transmitting apparatus of claim 17 wherein the first signal processing unit is configured to encode the data stream.

19. The transmitting apparatus of claim 18 wherein the first signal processing unit is capable of line coding the data stream.

20. A receiving apparatus for wirelessly receiving two electric signals to produce a received data stream comprising:
- a first receiving terminal capable of detecting a first electric field, which detection induces a received repeated signal on the first receiving terminal;
- a second receiving terminal separated in space from the first receiving terminal and capable of detecting a second electric field, which detection induces a received inverted signal on the second receiving terminal; and
- a data stream restorer, each of such receiving terminals coupled to the data stream restorer such that the received repeated signal and the received inverted signal are combined to produce a received data stream,
- wherein the receiving apparatus is oriented with respect to a transmitting apparatus such that at least one nonconductive medium separates the receiving apparatus from the transmitting apparatus, the nonconductive medium not belonging to the transmitting apparatus, the elements of the transmitting apparatus, the receiving apparatus, or the elements of the receiving apparatus and
- wherein each of the transmitting apparatus and the receiving apparatus is contained in a separate device.

21. The receiving apparatus of claim 20 further comprising at least one amplifier such that at least one of the received repeated signal and the received inverted signal is amplified before being received by the data stream restorer.

22. The receiving apparatus of claim 21 further comprising at least one filter such that at least one of the received repeated signal and the received inverted signal is filtered before being received by the data stream restorer.

23. The receiving apparatus of claim 20 further comprising at least one protective circuit such that one or more components of the receiving apparatus is protected from predetermined voltage levels which may damage one or more components of the receiving apparatus.

24. The receiving apparatus of claim 20 further comprising at least one protective circuit such that one or more components of the receiving apparatus is protected from predetermined current levels which may damage one or more components of the receiving apparatus.

25. The receiving apparatus of claim 20 wherein the data stream restorer comprises a combining circuit.

26. The receiving apparatus of claim 25 wherein the data stream restorer further comprises a decoder such that the received data stream produced by the data stream restorer is decoded.

27. The receiving apparatus of claim 26 wherein the decoder is a line decoder.

28. The receiving apparatus of claim 20 wherein the data stream restorer comprises a second signal processing unit coupled to at least two analog-to-digital converters.

29. The receiving apparatus of claim 28 wherein the second signal processing unit is capable of decoding to produce the received data stream.

30. The receiving apparatus of claim 29 wherein the second signal processing unit is capable of line decoding to produce the received data stream.

* * * * *